No. 670,438. Patented Mar. 26, 1901.
F. & A. SHUMAN.
MACHINE FOR MOLDING GLASS.
(Application filed Sept. 20, 1900.)
(No Model.) 2 Sheets—Sheet 1.
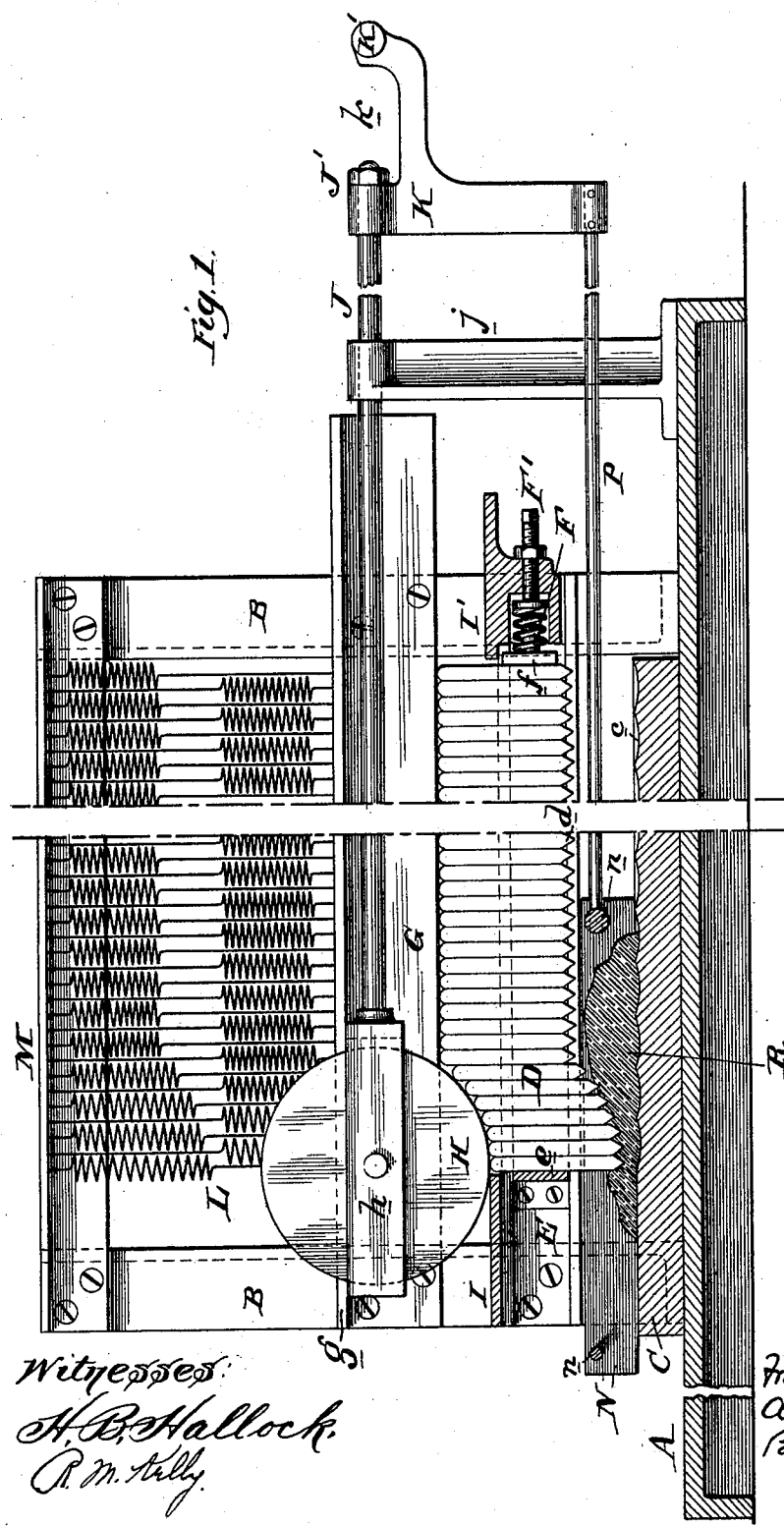

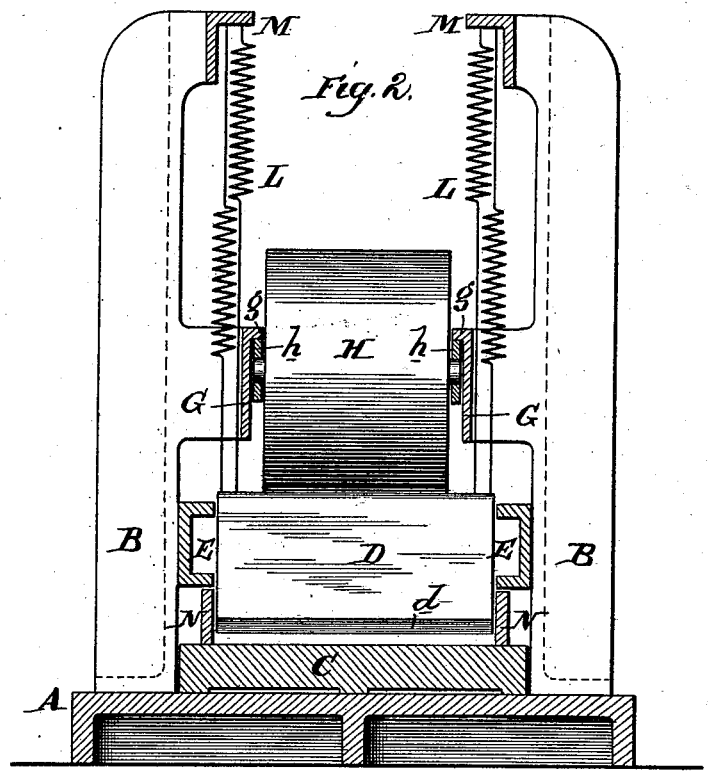
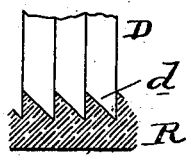
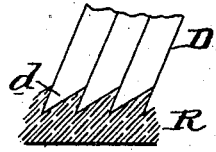
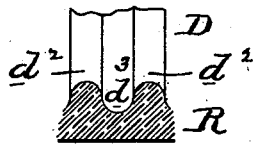
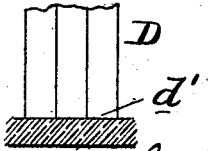
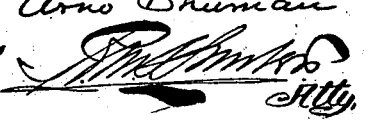

UNITED STATES PATENT OFFICE.

FRANK SHUMAN AND ARNO SHUMAN, OF PHILADELPHIA, PENNSYLVANIA.

MACHINE FOR MOLDING GLASS.

SPECIFICATION forming part of Letters Patent No. 670,438, dated March 26, 1901.

Application filed September 20, 1900. Serial No. 30,593. (No model.)

*To all whom it may concern:*

Be it known that we, FRANK SHUMAN and ARNO SHUMAN, of the city and county of Philadelphia, in the State of Pennsylvania, have invented an Improvement in Machines for Molding Glass, &c., of which the following is a specification.

Our invention has reference to molding-machines for substances in plastic condition; and it consists of certain improvements fully set forth in the following specification and shown in the accompanying drawings, which form a part thereof.

In molding prismatic glass and other substances in the plastic or semifluid condition by rollers, as has heretofore been largely the practice, the sharpness of outline and accuracy of configuration have been very difficult to secure, especially so in cases where large relief and area were required. In those processes where accuracy in design or relief configuration were secured the area of the molded plate has been very circumscribed, because in molding between dies the plastic or semifluid material becomes locked at the central portion of the mold and does not flow properly beyond a very limited area. A further disadvantage in this latter process is danger of having a portion of the glass, technically called the "cold spot," find its way between the dies, and thereby interfere with the free flowing of the more-fluid glass.

The object of our invention is to provide a suitable apparatus for carrying on a special process in molding which shall overcome the above objections inherent in the present methods in vogue.

In our improved method of molding we place the glass or other semifluid substance upon a mold-table and while confining it laterally subject it to the successive actions of sectional dies arranged in close parallel assemblage. In this manner the glass is treated to a series of narrow surfaces of pressure and each successive action gradually coming into play before the glass is released from the action of a series of the dies which immediately preceded such successive action. In this manner the ball of glass or body of plastic material is pushed forward and only enough taken therefrom to actually supply the requirements of each molding-die. By properly proportioning the machine any desired area of glass or other substance may be molded accurately either with irregular or plain surface, as desired.

In carrying out our invention we provide a flat table, of metal, having a plain or irregular upper surface, as may be required, and above this we place a large number of flat mold plates or dies arranged in juxtaposition and adapted to be moved to or from the table independently under the action of a traveling roller or cam. The table is provided with side confining plates or shoe which shall restrict the lateral flow of the glass under the pressure exerted by the mold-plates. Our improvements also contemplate many details of construction, all of which will be better understood by reference to the drawings, in which—

Figure 1 is a longitudinal sectional elevation through the machine, showing the apparatus in process of operation. Fig. 2 is a cross-section of same, and Figs. 3, 4, 5, and 6 are elevations showing how the changing of the shape of the operating edges of the dies will produce sheets of molded material having surfaces of different characteristics.

A is the bed-plate of the machine and has on its sides the upright frames B, carrying at their upper ends the longitudinal bars M.

E E are two longitudinal guide-bars secured to the uprights B and between which are supported the upright mold-plates D. These mold dies or plates are flat and rest one against the other, being supported at one end by the cross-plate $e$ and at the other end by an adjustable plate $f$, pressed against them by the spring F, whose tension is adjusted by a screw F'. By this or any other suitable means of adjustment the friction between the plates may be varied and compensation for wear provided for. If desired, the parts $f$, F, F', and $e$ may be transposed.

The lower ends of the die-plates D are specially shaped, as at $d$, $d'$, or $d^2$, (shown in the several figures,) to suit the configuration of the surface to be molded.

G G' are two angle-iron plates secured to the uprights B of the machine and act as guides for the yoke $h$, in which the roller H is journaled. The roller H rests upon the tops of the plates D when molding, and when not on the said plates it is supported on either of the shelves I or I', one being at each end of the machine. This roller acts as an antifriction-cam, and its function is to gradually depress the mold-plates in succession and then release them, so that they can be raised by the action of the springs L. These springs L connect at their lower ends with the die-plates D and at the tops with the bars M. The lower edges of the angle-iron bars G act as stops for the mold plates or dies D in their upward movement.

C is a molding-table and rests upon the bed-plate A immediately below the plates D and receives the glass or plastic material R to be molded. This table is adjustable on the bed-plate for a purpose to be explained later on. The bed-plate acts as the base or foundation of the entire structure of the machine and also as a specific support and guide for the adjustable molding-table.

N is a traveling shoe and consists of two side plates connected by cross-rods $n$, the said plates resting upon the table C and extending upward on each side of the lateral edges of the plates D and held down by the lower parts of the guide-bars E.

The yoke $h$ of the roller H is secured to a rod J, which extends beyond the end of the machine and is guided in a bearing $j$. Its end is loosely connected with a handle-frame K, having the handle proper, K', and a clearance-space $k$. The end of the rod J has a nut J', against which the handle-frame may pull, as shown in Fig. 1. When the handle-frame K is pushed back to return the roller, it slips backward on the rod until the nut J' strikes the frame K just back of the handle, and then the parts K and J move together. The lower part of the frame K is connected positively with the traveling shoe N by rods P, so that when the roller H is being pulled over the mold-plates D the shoe N travels along and is always in a position to support the glass or plastic material against lateral flowing and escape. The roller H rolls from shelf I to shelf I' at the two ends of the machine, and in its passage from one shelf to the other it successively forces down the intermediate mold-plates D.

To start the machine, the handle-frame K is pushed back until the roller H is on shelf I and the shoe N moved back as far as possible. The table C is then pulled back onto the extension of the bed-plate. The glass may now be placed upon the table, between the side plates of the shoe N, and the table pushed back under the mold or die plates D. By pulling upon the handle K' the frame K is moved forward to bring the shoe in proper position, and a continued movement then moves the roller H and shoe N along simultaneously and at the same time causes the roller to operate upon the die-plates, as above described.

When the glass has been molded, it will be found that the cold spot will be wholly at the left end, or where the beginning of the molding operation began, and may be cut off, and thus not allowed to mar the otherwise perfect plate. In types of molding in which the glass is subjected to compression over its whole surface this cold spot of the glass is forced to mingle with the more-fluid glass and produces an inferior product. This is entirely overcome by use of our machine.

In some cases the under side of the molded article is to be flat, in which case the surface of the table C is made flat; but in other cases this surface must be irregular, as at $c$, and hence the surface configuration of the molded glass or other material may be irregular on both surfaces. In Fig. 1 we have shown the table as formed with concave transverse grooves $c$, which produce in the molded glass a series of convex ribs. It thus appears that either or both of the surfaces of the molded substance may be formed with flat or irregular designs.

In Fig. 3 the prismatic glass R formed has the ribs with one vertical and one oblique face, while in Figs. 1 and 2 the ribs would have two oblique faces. In the case of Fig. 6 the ribs are so formed as to overhang, due to the oblique arrangement of the mold-plates D. In this case the roller should move over these plates from right to left to reduce the friction.

In Fig. 4 the plates D have their lower ends alternately grooved and rounded, as at $d^2$ and $d^3$, respectively, to produce a wave effect. In Fig. 5 the lower ends of the plates D are made flat, as at $d'$, to secure a flat surface. By simply varying the under surfaces and the thickness and lengths of the plates, or either of them, the designs of the finished molded product may be varied.

While we have shown the use of springs L to elevate the plates D, any other expedient well known in the mechanical arts may be employed in place of them.

The molded glass may be removed with the mold-table and annealed without disturbing it, thereby obviating the possibility of injury to the accuracy of its configuration by handling.

While we have assumed that the mold-table C will be used stationary and the roller or cam device H moved over the mold-plates D in the normal operation of the machine, it is self-evident that the reverse may be done—namely, the cam device or roller H may be held in fixed relation and the mold-table C and mold-plates D moved bodily under it, the principle of operation and process resulting being identical.

While we prefer the construction herein set out and shown, we do not confine ourselves to the minor details, as these may be modified or varied without departing from the spirit of the invention.

Having now described our invention, what we claim as new, and desire to secure by Letters Patent, is—

1. In a molding-machine, the combination of a mold-table, a series of parallel mold-plates adapted to be moved toward and from said mold-table, and a power device common to all of the plates for successively moving the said mold-plates toward the mold-table.

2. In a molding-machine, the combination of a mold-table, a series of parallel mold-plates adapted to be moved toward and from said mold-table, a power device for moving said mold-plates one after the other toward the mold-table, and means independent of the power device for moving the mold-plates away from the mold-table.

3. In a molding-machine, the combination of a mold-table, a series of parallel mold-plates adapted to be moved toward and from said mold-table, and power devices consisting of a cam-surface movable transversely across the upper edges of the mold-plates for successively moving the said mold-plates toward the mold-table.

4. In a molding-machine, the combination of a mold-table, a series of parallel mold-plates adapted to be moved toward and from said mold-table, springs for moving the mold-plates away from the mold-table, and power devices consisting of a roller movable transversely across the upper edges of the mold-plates for successively moving the said mold-plates toward the mold-table.

5. In a molding-machine, the combination of a mold-table, a series of parallel mold-plates adapted to be moved toward and from said mold-table, a movable shoe resting on and movable upon the mold-table and forming lateral walls between which the mold-plates pass to prevent lateral spreading of the material to be molded but open on top bottom and ends.

6. In a molding-machine, the combination of a mold-table, a series of parallel mold-plates adapted to be moved toward and from said mold-table a shoe resting on the mold-table and forming lateral walls between which the mold-plates pass to prevent lateral spreading of the material to be molded and movable upon the mold-table so as to be in alinement with the mold-plates being moved toward the mold-table, and power devices consisting of a cam-surface movable transversely across the upper edges of the mold-plates for successively moving the said mold-plates toward the mold-table.

7. In a molding-machine, the combination of a main frame and bed-plate, with mold-table adjustably supported upon the bed-plate, a series of mold-plates movable to and from the mold-table, a cam device movable over the mold-plates to successively depress them, a traveling shoe to confine the material being molded against flowing laterally from under the mold-plates, and means for simultaneously moving the cam device and shoe in the same direction and for allowing the shoe to be moved back with the table a greater distance than the cam device when it is desired to introduce fresh material to be molded or remove the molded plate.

8. In a molding-machine, the combination of a mold-table, a series of parallel mold-plates adapted to be moved toward or from the table, adjusting devices for adjustably holding the plates against one another, and power devices for successively moving the said mold-plates toward the mold-table.

9. In a molding-machine, the combination of a mold-table, a series of parallel mold-plates adapted to be moved toward or from the table, spring devices for adjustably holding the plates against one another with an elastic pressure, and power devices for successively moving the said mold-plates toward the mold-table.

10. In a molding-machine, the combination of a mold-table, a series of mold-plates movable toward and from the table and having their operating ends in close juxtaposition, a roller for successively depressing the plates toward the table, means for supporting and guiding the roller transversely across the upper ends of the mold-plates, and a shelf arranged at one or both ends of the series of mold-plates for receiving and supporting the roller when all of the mold-plates are to be raised.

11. In a molding-machine, the combination of a mold-table, a series of mold-plates movable toward and from the table and having their operating ends in close juxtaposition, a traveling cam-surface movable over the mold-plates for successively depressing the plates toward the table, means for supporting the guiding-cam surface transversely across the upper ends of the mold-plates, and supports for sustaining the cam-surface in position beyond the mold-plates whereby it is moved out of the way when all of the mold-plates are to be raised.

In testimony of which invention we have hereunto set our hands.

FRANK SHUMAN.
ARNO SHUMAN.

Witnesses:
  ISAAC WOOD,
  CHARLES Q. MACDONOUGH.